Sept. 20, 1949.　　　W. L. CHRISTENSEN　　　2,482,095
COMBUSTION APPARATUS
Filed Oct. 3, 1946
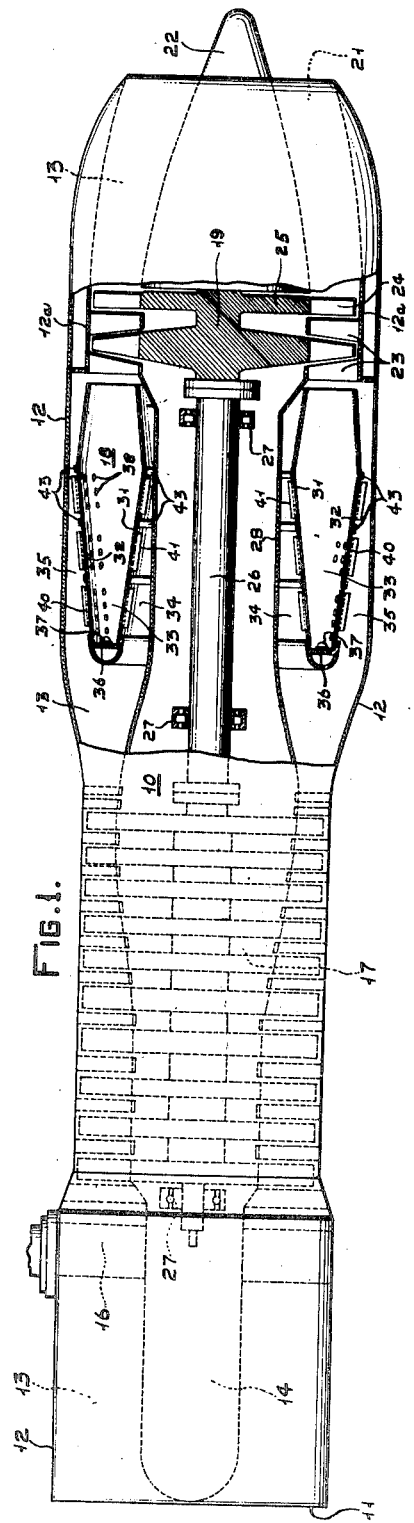
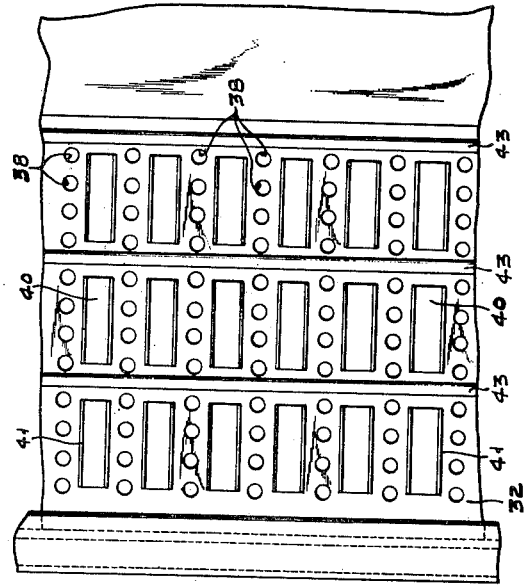
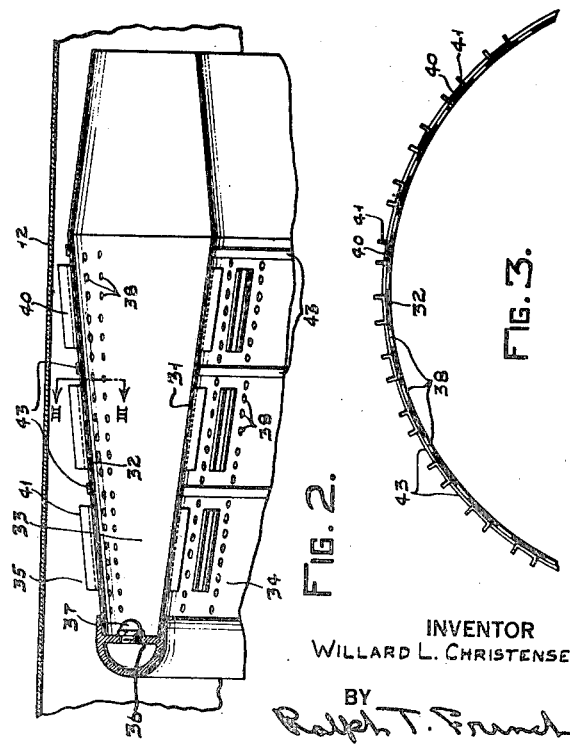
INVENTOR
WILLARD L. CHRISTENSEN.
BY
Ralph T. French
ATTORNEY Patented Sept. 20, 1949

2,482,095

UNITED STATES PATENT OFFICE 2,482,095

COMBUSTION APPARATUS

Willard L. Christensen, Moylan, Pa., assignor to Westinghouse Electric Corporation, East Pittsburgh, Pa., a corporation of Pennsylvania Application October 3, 1946, Serial No. 700,902

1 Claim. (Cl. 60—44)

This invention relates to combustion apparatus, more particularly to combustion chamber structure, and has for an object to provide improved apparatus of this character.

Another object of the invention is to provide, in a combustion chamber, novel means for preventing overheating of the chamber walls by transmitting heat therefrom to a surrounding blanket of relatively cool air.

Yet another object of the invention is to provide, in combustion chamber wall structure subject to dangerously high temperatures, novel means for cooling said wall structure and simultaneously strengthening it.

These and other objects are effected by the invention as will be apparent from the following description and claim taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged fragmentary view of a portion of the structure shown in Fig. 1, and comprises a longitudinal section through a portion of the combustion apparatus;

Fig. 3 is an enlarged sectional view, taken along the line III—III of Fig. 2, looking in the direction indicated by the arrows; and, Fig. 4 is a development of the structure shown in Fig. 3.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Fig. 1, and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine discs 25 and then are discharged through the propulsion nozzle 21 to propel the aircraft.

By reference to Fig. 1 it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12 and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions substantially parallel to the longitudinal axis of the power plant.

Referring to Figs. 2, 3 and 4, it will be seen that the inner and outer walls 31 and 32, respectively, are provided with rows of openings 38, the rows preferably extending longitudinally of the walls, in approximately parallel relation to the longitudinal axis of the annular burner space 33.

Because of its use in aircraft, the combustion apparatus, as well as all other parts of the power plant, must be of as light weight as is consistent with strength requirements. Consequently, the walls 12, 28, 31 and 32 are generally constructed of sheet metal of relatively light gage, for example No. 22 gage. Where combustion chamber walls of this character are subjected to temperatures in the order of 1500 degrees Fahrenheit and higher, the walls are subjected to large stresses tending to warp and deform the same, particularly when the fuel is supplied from a number of nozzles, which, due to clogging or other causes, may discharge different amounts of fuel resulting in different degrees of temperature.

The presence of the openings 38, for admission of air to the burner space 33 from the overlapping air spaces 34 and 35 further weakens the walls 31 and 32 and renders them more susceptible to warping due to uneven and excessive temperatures. To remove as much excess heat as possible from the walls 31 and 32, the latter have secured to their outer surfaces (that is, the air space sides thereof) channel members 40 whose legs 41 project into the air spaces 34 and 35 to transfer heat to the air flowing through said spaces. Preferably, the channels 40 are secured to the walls by numerous spot welds to insure adequate heat transfer from the walls to the channels. The channels are disposed between adjacent rows of openings 38, with the legs 41 extending generally parallel to the direction of flow of air in the air spaces 34 and 35.

Preferably, the channels are relatively short, and three, longitudinally aligned, are associated with each space between adjacent rows of openings, the channels of each aligned group being spaced sufficiently to permit the provision of transverse circumferentially-extending bands or reinforcing strips 43 welded or otherwise secured to the air space sides of the walls to further reinforce and brace the latter.

While the invention has been shown in but one form, it will be obvious to those skilled in the art that it is not so limited, but is susceptible of various changes and modifications without departing from the spirit thereof.

What is claimed is:

Combustion apparatus comprising wall structure defining a combustion chamber and an air space, said wall structure including an annular wall having circumferentially-spaced and longitudinally-extending rows of openings, said wall separating the combustion chamber from the air space; series of longitudinally-aligned channel members secured to the air space surface of said wall between adjacent rows of openings, the legs of the channel members projecting radially into the air space in heat transfer relation to air passing through said air space, and the members of each series being longitudinally spaced from one another; and a plurality of circumferential re-enforcing strips secured to the air space surface of the wall and positioned transversely of the series of channel members in the spaces between the members of the series.

WILLARD L. CHRISTENSEN.

REFERENCES CITED

The following references are of record in the file of this patent:

UNITED STATES PATENTS

| Number | Name | Date |
|---|---|---|
| 695,889 | Sherman | Mar. 18, 1902 |
| 1,660,348 | Newberry | Feb. 28, 1928 |
| 2,287,361 | Suchland | June 23, 1942 |
| 2,417,604 | McCollum | Mar. 18, 1947 |